US006286133B1

(12) United States Patent
Hopkins

(10) Patent No.: US 6,286,133 B1
(45) Date of Patent: *Sep. 4, 2001

(54) METHOD AND APPARATUS FOR STRATEGIC COMPILATION OF SOURCE PROGRAMS INTO TWO OR MORE TARGET LANGUAGES

(75) Inventor: Trevor Paul Hopkins, Bacup (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,581

(22) Filed: Mar. 10, 1998

(30) Foreign Application Priority Data

Jul. 31, 1997 (GB) .................................................. 9716067

(51) Int. Cl.[7] ...................................................... G06F 9/45
(52) U.S. Cl. ........................................... 717/5; 717/6
(58) Field of Search .................................. 395/705, 707, 395/708; 707/3; 717/5, 8, 6

(56) References Cited

U.S. PATENT DOCUMENTS

| 5,428,792 | * | 6/1995 | Conner et al. | 717/8 |
| 5,493,680 | * | 2/1996 | Danforth | 717/1 |
| 5,561,801 | | 10/1996 | Simons et al. | 717/6 |
| 5,598,560 | * | 1/1997 | Benson | 717/7 |
| 5,659,753 | * | 8/1997 | Murphy et al. | 717/5 |
| 5,732,274 | * | 3/1998 | O'Neill | 717/5 |
| 5,812,851 | * | 9/1998 | Levy et al. | 717/5 |
| 5,822,592 | * | 10/1998 | Zhu | 717/5 |
| 5,842,204 | * | 11/1998 | Andrews et al. | 707/3 |
| 5,875,331 | * | 2/1999 | Lindsey | 717/2 |
| 5,898,874 | * | 4/1999 | Gelfenbain | 717/5 |
| 5,960,200 | * | 9/1999 | Eager et al. | 717/5 |

OTHER PUBLICATIONS

Aho et al., Compilers, Principles, Techniques, and Tools, Addison–Wesley, pp. 6–7, 10, 393, 432, 562, 564, Sep. 1985.*
Alt et al., CoSy Compiler Phase Embedding with the CoSy Compiler Model, Proceedings of the 5th International Conference, CC '94, Edinburgh, U.K., Apr. 1994.*

* cited by examiner

Primary Examiner—Mark R. Powell
Assistant Examiner—Hoang-Vu Antony Nguyen-Ba
(74) Attorney, Agent, or Firm—Scully, Scott, Murphy & Presser; Casey P. August

(57) ABSTRACT

A method and apparatus which, as part of a compiler, supporting the generation of code in two (or more) target languages. The selection of the target language, and the program structure in that target language, is made depending on the capabilities of each target language, in a separate processing pass. Runtime efficiency is also improved by allowing selection of the most appropriate target language and program structure for a particular source code function.

3 Claims, 4 Drawing Sheets

METHOD AND APPARATUS FOR STRATEGIC COMPILATION OF SOURCE PROGRAMS INTO TWO OR MORE TARGET LANGUAGES

FIELD OF THE INVENTION

The present invention relates generally to a method and apparatus for compiling from a source language to two or more target languages, where the capabilities of each target language are significantly different. Target languages might be SQL (Structured Query Language) for data accesses, and C, for general computation.

BACKGROUND OF THE INVENTION

The normal processing steps within a compiler are: use parsing and lexical analysis to create a 'parse tree' from the 'source language'; (optionally) re-organise that parse tree to reduce unnecessary computation ('optimisation'); and a final, single pass of the parse tree to generate code in the 'target' language(s).

A problem with this approach is that, once code generation is started, each parse tree node is most conveniently translated into a single standard program structure in the target language(s). If only a single program structure or pattern is available, then that pattern must be very general to function correctly for every possible invocation. Such a general form typically performs slowly. This problem is exacerbated if each node can only be translated into one of several target languages.

If this approach is inadequate, then non-local information (that is, information from nodes elsewhere in the parse tree) must be available to make generally complex decisions as to which is the best pattern to use. This may involve information from parse tree nodes remote from the parse tree currently being processed, and complex, time-consuming and error-prone decision-making processing on a node-by-node basis.

This decision-making process becomes particularly difficult when code is emitted in two or more target languages, where code corresponding to some nodes can be emitted only in one language (for example, a data access and query language, such as SQL), for some other nodes, code can only emitted in another language (for example, a general purpose programming language, such as C), and for yet other nodes, either language can be used.

Further difficulties arise when one or more of the target languages have several different ways of expressing very similar processing, where one approach is fast, but can only be used in limited circumstances, while other approaches are more general, but typically execute more slowly. For example, in SQL, the choice of whether to use a cursor or inline data access code is particularly difficult to make.

What follows is a definition of terms that will be used in the following description of the present invention and specific examples thereof.

Code generation ('emitting code'): the process of traversing a parse tree (q.v.) and generating a program in one or more lower-level target languages (q.v.).

Implementation Language: the programming language(s) in which a compiler itself is written. The implementation language need not be the same as either the source language (q.v.) or target language(s) (q.v.).

Parse tree: a graph, usually a 'tree', or a 'directed acyclic graph', of parse tree nodes (q.v.) which represent the semantics and behaviour of a computer program in the source language (q.v.), or a portion thereof.

Parse tree node ('node'): part of a parse tree (q.v.), representing a single operation or function in the source language (q.v.).

Parsing: the process of converting a textual representation of a programming language (source language) into a parse tree (q.v.).

Source Language ('source code'): The input language to a compiler. Usually, the source language for a compiler is a high-level language, such as a business modelling language.

Target Language ('target code'): The output language from a compiler. Usually, the target language(s) of a compiler are a low-level language, such as assembly code, C or SQL. Often, the target language(s) may be further processed; for example, by another compiler or assembler.

SUMMARY OF THE INVENTION

In accordance with the present invention, there is now provided a method for compiling a source program written in a source language into a compiled program comprising a plurality of different target languages, the method comprising: generating a parse tree from the source program, the parse tree comprising a plurality nodes each representative of an operation in the source program; determining, for each successive node of the parse tree, the target language into which the node can be compiled based on the operation represented by the node; generating, based on the target language determination, a list of start points each corresponding to a different node of the parse tree and each indicating the target language into which the node is to be compiled; and, generating successive sections of the compiled program each based on each node of the parse tree between successive start points in the list and each being generated in the target language specified by the first of the successive start points.

Viewing the present invention from another aspect, there is now provided apparatus for compiling a source program written in a source language into a compiled program comprising a plurality of different target languages, the compiler comprising: means for generating a parse tree from the source program, the parse tree comprising a plurality nodes each representative of an operation in the source program; means for determining, for each successive node of the parse tree, the target language into which the node can be compiled based on the operation represented by the node; means for generating, based on the target language determination, a list of start points each corresponding to a different node of the parse tree and each indicating the target language into which the node is to be compiled; and, means for generating successive sections of the compiled program each based on each node of the parse tree between successive start points in the list and each being generated in the target language specified by the first of the successive start points. It will be appreciated that the present invention extends to a computer system including such compiling apparatus.

In preferred embodiments of the present invention, code generation is divided into two parts:

(1) Placing Start Points

Before code generation starts, an initial pass of the entire parse tree is made. During this pass, strategic decisions about the correct and most efficient form of the target language(s) are made. These strategic decisions are recorded in an ordered list of start points, each of which reference a particular parse tree node.

The initial strategic decisions are based on the kind of the current parse tree node, as well as previous decisions made, and tests made by look-ahead down the parse tree. Note, however, that this method reduces the need to perform decision-making look-ahead during code generation.

Different start points are each of a particular kind. Each kind of start point indicates the general form (pattern) of the target code to be emitted, and which target language is to be used. Start points also refer to their previous (outer) start point, so that previous decisions can be changed or reversed. For example, the kind of a start point can be changed subsequently, if it is later discovered that a code pattern represented by a particular start point would be incorrect or inefficient. Further start points can be added, or start points can be removed or re-ordered.

(2) Processing Start Points

The list of start points is used in order, each representing the 'starting point' for code generation. Code generation therefore starts from the parse tree node referenced by each start point, and progresses down the parse tree until another start point is encountered. Start points therefore also function as 'stop points'.

The kind of start point indicates the pattern of the emitted code, and which of several target programming languages should be used. For example, the kind of a start point might indicate that a function definition (in C) should be emitted, or that a database access is needed (using inline SQL), or that an SQL cursor should be processed (using both C and SQL).

Some code generation decisions can still be made at this time (tactical decisions); for example, some start points can be ignored, for trivial or special cases. Furthermore, the pattern and target language to be used can be decided based on pairs (or groups) of start points.

The list of start points can also be processed several times prior to code generation; for example, to emit target language definitions for global variables, (SQL) host variables, function prototype definitions, data conversion tables and (SQL) cursor definitions.

The present invention provides a solution to the problem of efficiently compiling high-level languages into multiple low-level languages, such as SQL and C, taking maximum advantage of the capabilities of each target language. In preferred embodiments of the present invention, the two complex processes (target language and pattern decisions, and code generation itself) are separated cleanly. This allows for both parts to be more sophisticated, and still be made to work correctly. This improved software maintainability is also important when the capabilities of the source language are extended. The two parts can be altered independently of one another; for example, the start point placement can be changed to 'tune' the runtime performance, or to cater for the differences between target language variants (e.g. SQL'89, SQL'92).

In a particularly preferred embodiment of the present invention to be described shortly, there is provided a method and apparatus which uses an initial pass of a parse tree, making decisions on which target language and program structure (pattern) is to be chosen, before code generation takes place.

Preferred embodiments of the present invention will now be described, by way of example only, with reference to the accompanying drawings, in which.

DETAILED DESCRIPTION OF THE INVENTION

What is Needed to Work the Invention

Figure 1:
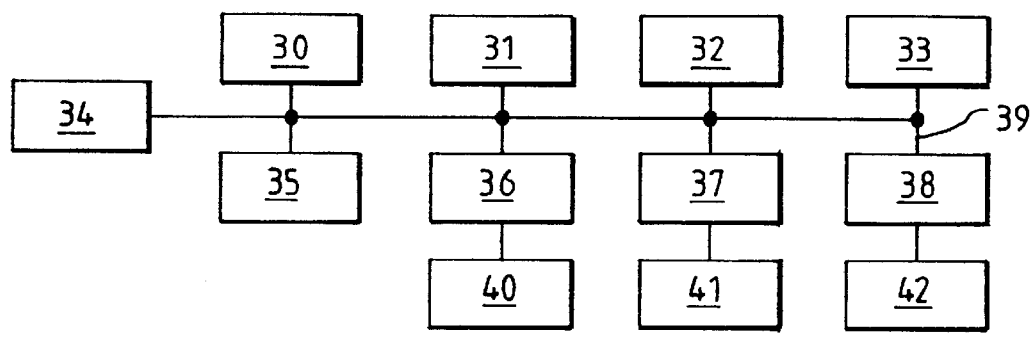
FIG. 1 is a block diagram of a computer system.

Referring first to FIG. 1, a computer system comprises a system random access memory (RAM) 30, a system read only memory (ROM) 31, a central processing unit (CPU) 32 such as an Intel Pentium microprocessor or the like, a mass storage device 33 comprising one or more large capacity magnetic disks or similar data recording media, one or more removable storage means 34 such as floppy disk drives, CD ROM drives and the like, a network adaptor 35, a keyboard adaptor 36, a pointing device adaptor 37, and a display adaptor 38, all interconnected via a bus architecture 39. A keyboard 40 is coupled to the bus architecture 39 via the keyboard adaptor 36. Similarly, a pointing device 41, such as a mouse, touch screen, tablet, tracker ball or the like, is coupled to the bus architecture 39 via the pointing device adaptor 37. Equally, a display output device 42, such as a cathode ray tube (CRT) display, liquid crystal display (LCD) panel, or the like, is coupled to the bus architecture 39 via the display adaptor 38. Additionally, the computer system may be coupled to other computer systems via the network adaptor 35.

Basic input output system (BIOS) software is stored in the ROM 31 for enabling data communications between the CPU 32, mass storage 33, RAM 30, ROM 31, removable storage 34, and adaptors 35–38 via the bus architecture 39. Stored on the mass storage device 33 is operating system software and application software. Further application software may be loaded via the removable storage 34 or the network adaptor 38. The operating system software enables the computer system to select and run the application software.

The application software comprises: a lexical analyzer and parser for converting (parsing) a textual representation of a computer programming language into a parse tree; and a code generator for converting parse trees (or parts thereof) into several target programming languages; and, a compiler and runtime system, or an interpreter for converting the target languages into a runnable form, or otherwise execute programs in the target languages. The code generator is structured in accordance with the following description.

Placing Start Points

Figure 2:
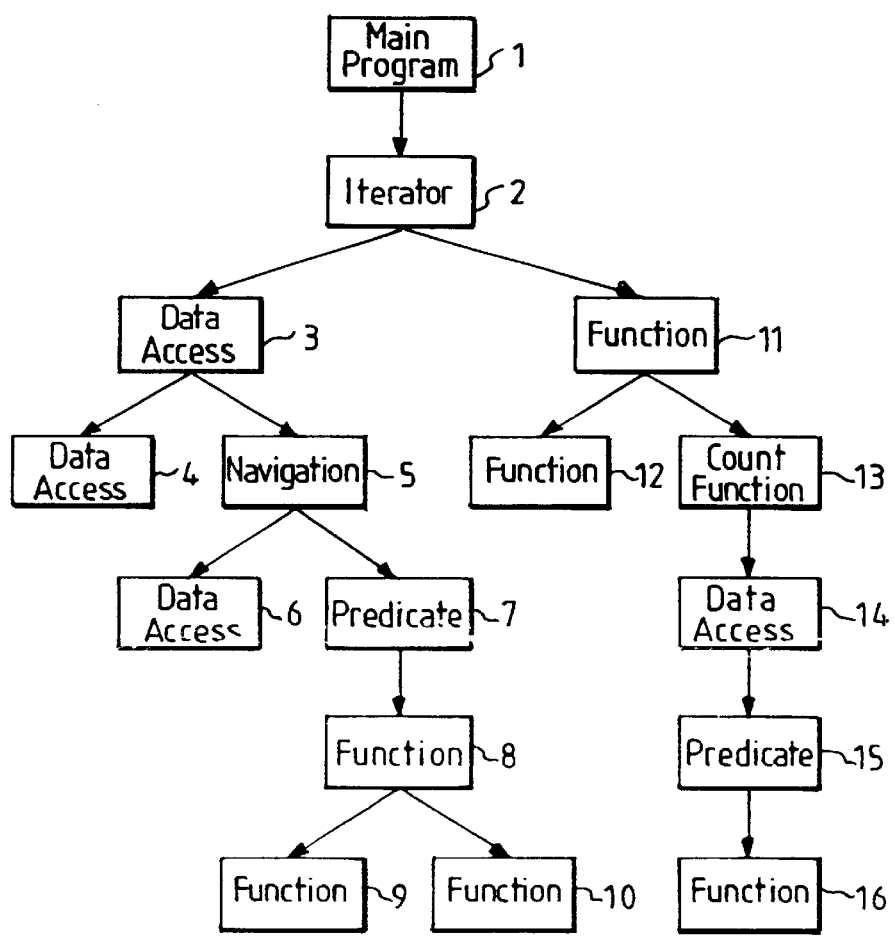
FIG. 2 is a block diagram of a parse tree.

Consider the simplified example parse tree shown in FIG. 2. The first stage of operation of the code generator involves placement of start points on some of the nodes in the parse tree, using a traversal of the parse tree from the top (root) of the tree. Initially, the rules which determine whether a particular node can be emitted in a particular target language are set up to correspond to a general-purpose programming language (for example, C).

Figure 3:
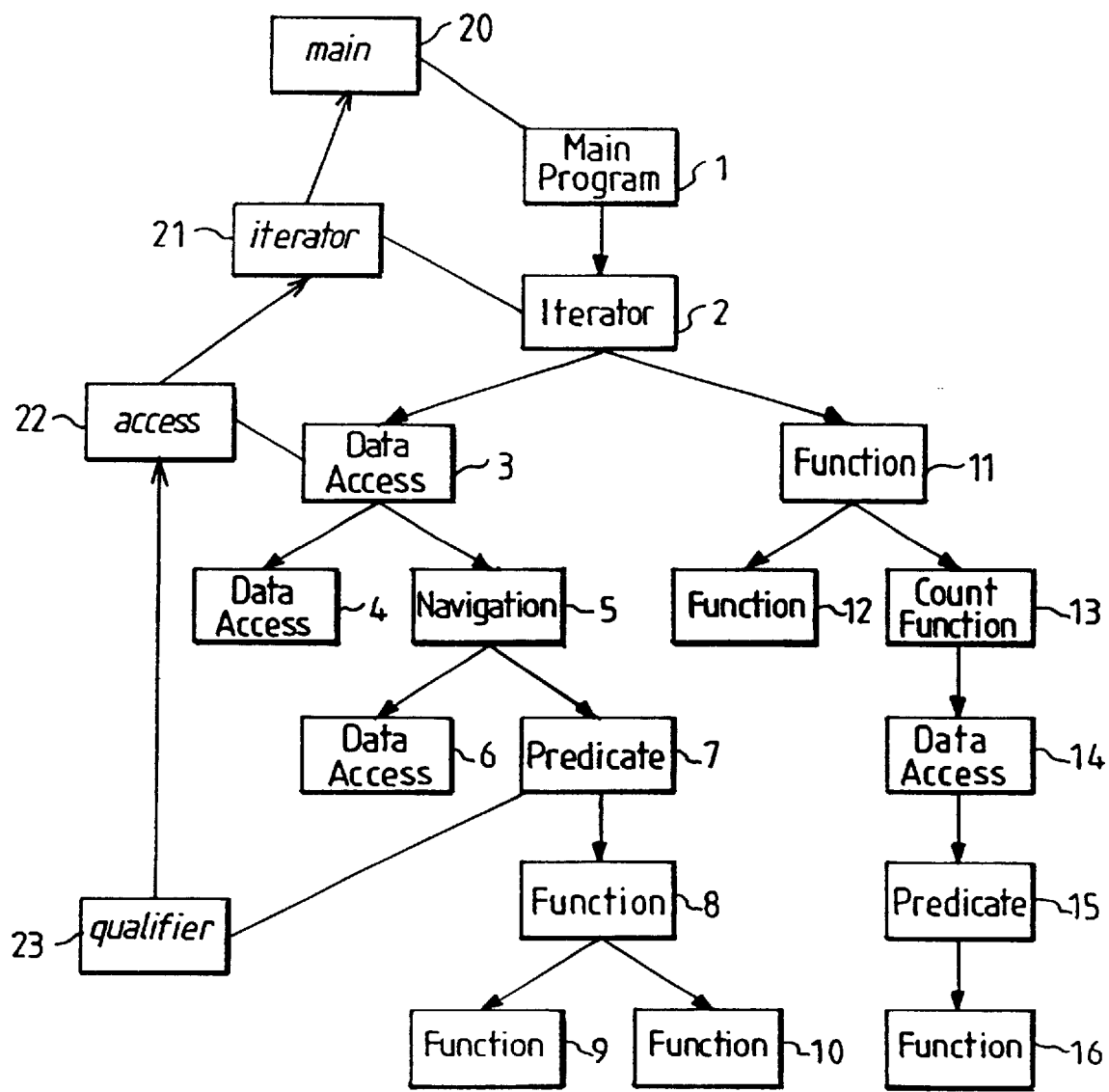
FIG. 3 is a block diagram of the parse tree with partial start point placement.

Referring now to FIGS. 2 and 3 in combination, the process starts at node 1, 'main program'. A main start point 20 (that is, a start point of kind main) is always placed on the root node. There may be several kinds of main start point; the kind of the main start point may be changed subsequently, using the process described below.

When a start point is placed on a node, it may optionally be treated as the 'current outer' start point. When a current outer start point is placed, it is treated as the parent of subsequently placed start points (that is, start points on nodes further down the parse tree), unless a further current outer start point is placed (and so on recursively as necessary). Once the start point placement processing for a node is completed, the previously valid outer start point is restored.

A main start point 20 is always placed as a outer start point, so that subsequent start points always point transitively to this start point.

For each parse tree node, the start point placement process is applied recursively to each of a child nodes; usually, the child nodes will be the arguments of a function. The nodes are processed in a depth-first, left-to-right order.

Following this approach, the next node processed is node 2, 'Iterator'. Iteration will in general require some kind of loop construct, which is not available in some programming languages (such as SQL). This parse tree node is marked with an iterator outer start point 21. Also, the rules which decide whether a node is valid for a particular programming language are changed to be suitable for the data access and query language (for example, SQL).

Node 3, 'Data Access' is processed next. This represents the access of data items from a database, and will require the use of query language (such as SQL); general-purpose languages, such as C, do not have this capability. This node is marked with an access outer start point 22.

Node 4, 'Data Access' is processed next. Provided that only a small number of database tables are accessed, then this data access can be included with the previous database access. Note that this requires a count of the number of tables accessed so far to be maintained. No start point is placed here.

Node 5, 'Navigation' is processed next. Again, provided the aggregate of the number of database tables is small, then this navigation can be included as part of the previous data access (using a 'join' operation in SQL, for example). No start point is placed.

Node 6, 'Data Access' is processed next. Once again, this can be combined with previous accesses, and no start point is placed. Note that, if the aggregate number of tables accessed had been too large (SQL, for example, has a limit of 15 tables), then an access outer start point would have been placed on this node, with a reference to the outer start point 22; start point 22 would have had its kind changed to cursor access, since it will in general be necessary to use a (SQL) cursor to access the database in such a way that subsequent data accesses can be correlated.

Node 7, 'Predicate' is processed next. At this point, it is not known whether the predicate function can be treated as part of the previous data access (with code generated in SQL), or whether the function must be handled separately. The more optimistic possibility (SQL generation) is chosen initially, but this decision may be changed later. This node is marked with a qualifier outer start point 23.

FIG. 3 illustrates the combination of parse tree and start points at this point.

Figure 4:
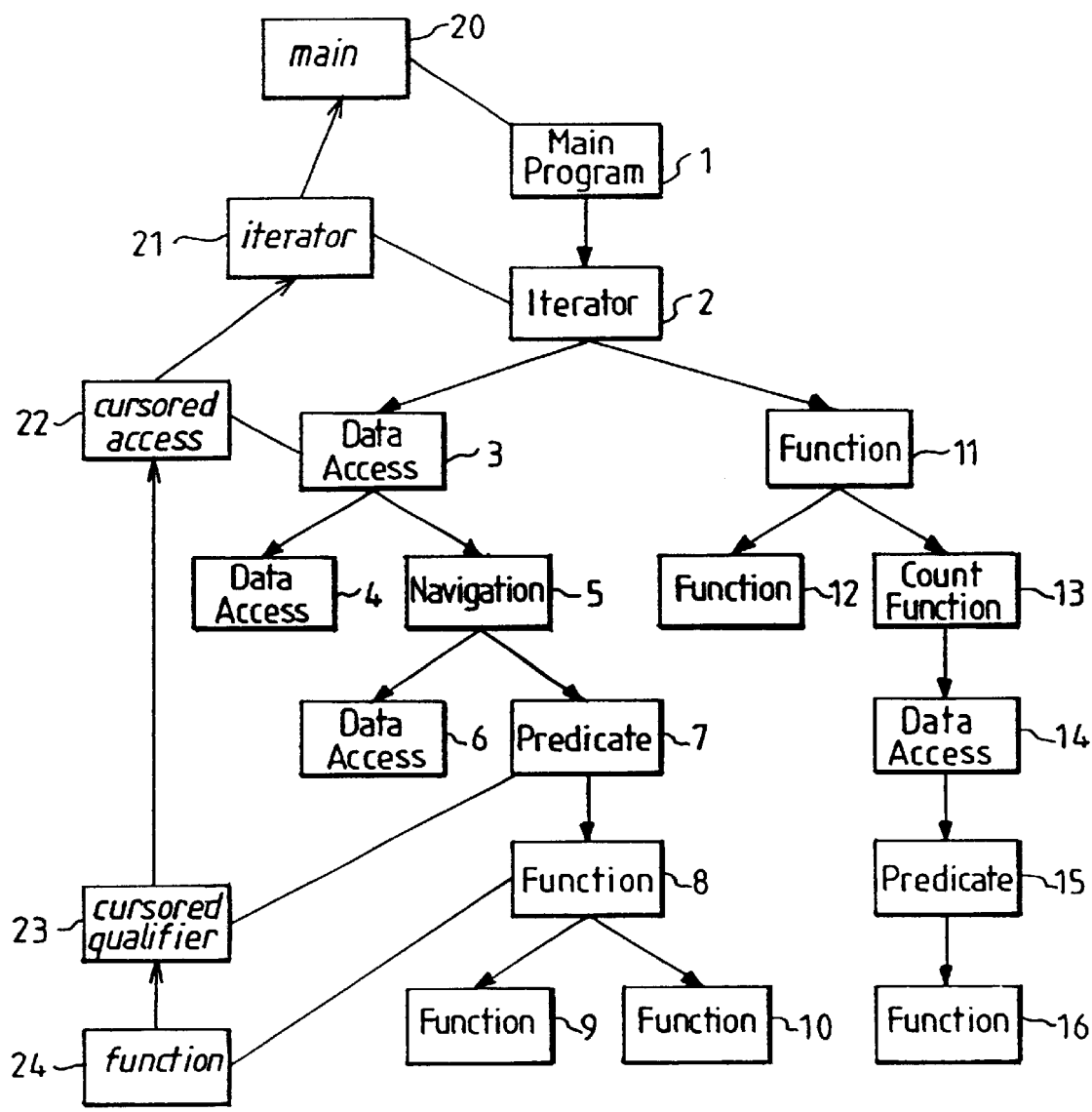
FIG. 4 is a block diagram of the parse tree with further start point placement; and, FIG. 5 is a block diagram of the parse tree with complete start point placement.

Referring now to FIGS. 2 and 4 in combination, Node 8, 'Function' is processed next. For illustration, it is assumed that the function represented by node 8 cannot always be implemented directly in the data access language. For example, the 'exclusive or' function has no direct implementation in SQL. Therefore, the node is marked with a function outer start point 24. The qualifier start point 23 is changed to a cursored qualifier start point, indicating that the processing for the predicate must be performed by a general-purpose language (for example, C). Also, the access start point 22 is converted to a cursored access start point, since (for example) an SQL cursor will be needed to extract the data in such a fashion that the predicate can be performed in another language. Finally, the rules used to determine whether a node is allowed in a particular language must be changed to those suitable for a general-purpose programming language (for example, C).

FIG. 4 illustrates the parse tree and start points at this point.

Figure 5:
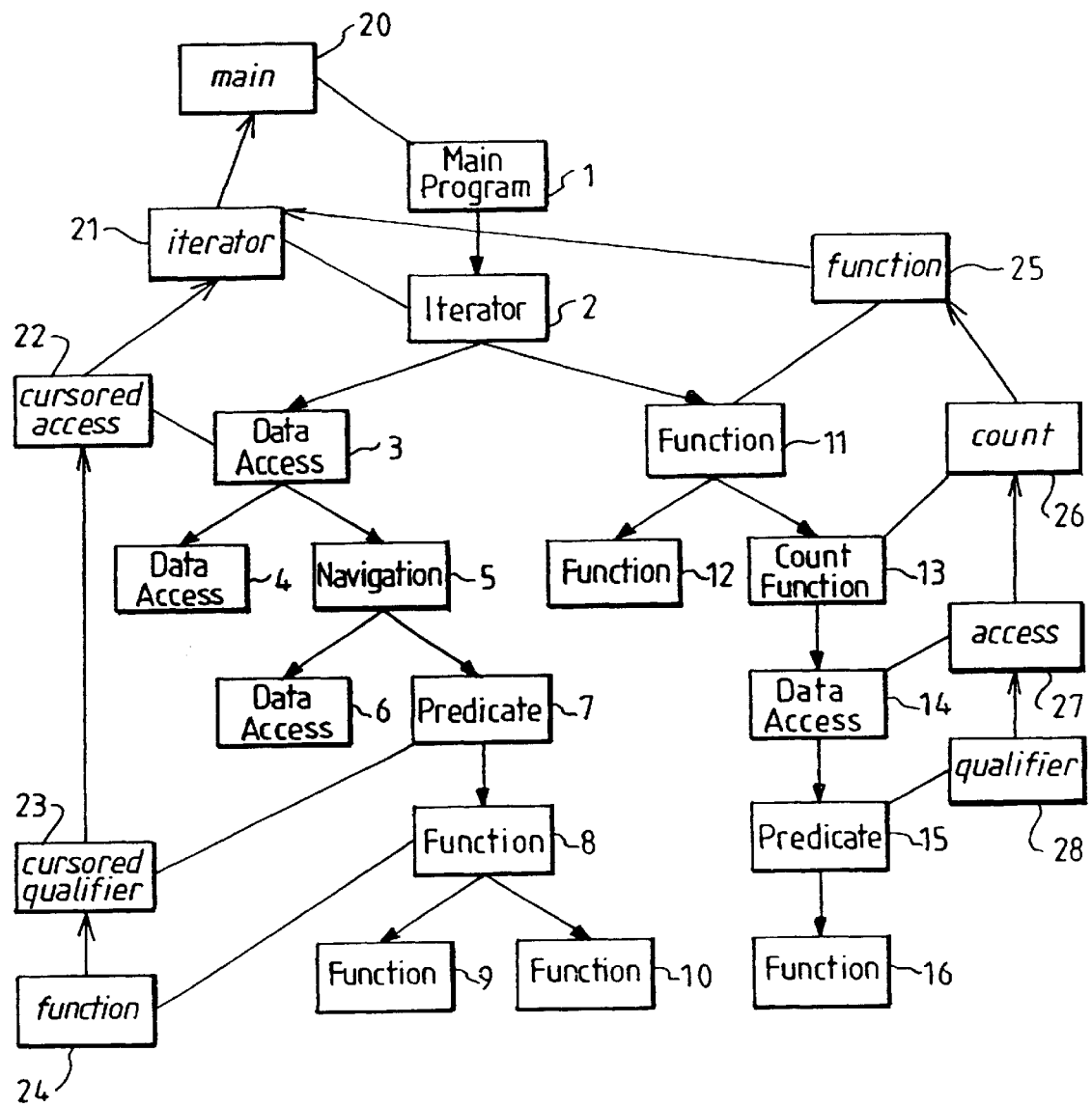

Referring now to FIG. 2 and 5 in combination, node 9, 'Function' and Node 10, 'Function' are now processed in order. of course, these functions might have further nodes (arguments), but for illustration, it is assumed that these are functions of zero arguments (such as the 'today' function) or constants. For illustration, it is assumed that these functions can be planted directly (in 'in-line' code) in the general-purpose programming language; no start points are placed. This completes the processing of the left branch of node 2. The recursive process unwinds back to node 2; note that this means that the current outer start point is once again node 2, and that the rules in use are those for the general-purpose language.

Node 11, 'Function' is processed next. For illustration, it is assumed that target language code for this node can be planted in the general-purpose programming language (for example, C); however, it cannot be inlined, and instead a function definition and call must be used instead. This node is marked with a function outer start point 25.

Node 12, 'Function' is processed next. This can be inlined in the general-purpose target language, and no start point is needed.

Node 13, 'Count Function' is processed next. This represents a count of the number of data elements represented by its argument (node 14), which must represent a data access. In the generated code, this could be represented using an inline (SQL) statement (such as the COUNT function); alternatively, it might require the use of a cursor. As before, the most optimistic assumption is made initially, with a count outer start point 26 being placed on this node. Also, the rules used are switched to those suitable for the data access language (for example, SQL).

Node 14, 'Data Access' is processed next. Again, it is not yet known whether the eventual target language code will require the use of a cursor. The most optimistic assumption is made, so that this node is marked with an access outer start point 27.

Node 15, 'Predicate' is processed next. Once again, it is not known whether the predicate function can be treated as part of the previous data access (with code generated in SQL), or whether the function must be handled separately. The more optimistic possibility (SQL generation) is chosen initially, but this decision may be changed later. This node is marked with a qualifier outer start point 28.

Node 16, 'Function' is processed next. For illustration purposes, it is assumed that this function (and any children it might have) can be planted as inline code in the data access language. Therefore, no start point is needed, and the current outer start point 28 is not changed to a cursored qualifier node. Note that this means that the entire expression represented by the count start point 26 will correspond to generated code entirely in the data access language (for example, SQL).

FIG. 5 illustrates the final placement of start points on the parse tree.

In summary, the emitted code, in the two target languages, will consist of a main program in the general-purpose language, which performs an iteration over the data access represented by start point 22. The data for the iterator is provided by opening a single (SQL) cursor over the data accesses represented by nodes 3, 4, 5 and 6, qualified by node 7 and children. Individual elements from the iterator are processed by the function forming the second argument to node 2, with a separate counted data access (inlined in SQL) being performed.

Processing Start Points

The start points are now processed one or more times, in the order in which they were added to the parse tree.

The list of start points is first scanned for those start points which imply, in one or more of the target languages, that variables need to be defined. For example, if SQL is one of the target languages, then 'host variables' will be needed for the code corresponding to start points 22 (cursored access) and 26 (count). Other start points are ignored during this pass.

The list of start points is scanned again for the definitions of functions or other code fragments which will be needed later. For example, if SQL is one of the target languages, then a 'cursor definition' for start point 22 (cursored access) will be generated. This process is an example of code generation (described later). Other specialised code fragments, such as data access and conversion functions, or forward definitions of function signatures to be generated in total later, can also be emitted here. Other start points are ignored during this pass.

Finally, the code generation stage proper starts, with each start point being processed in turn. In general, code in one or more target languages is generated in the usual way, by emitting code for each node, and then recursively processing each of the subsequent nodes (for example, the arguments to a function). Here, this process is followed, except for two important aspects: firstly, code generation always starts from a start point, and some code in one or more of the target language can be emitted based on information in the start point alone; secondly, the recursive code generation process terminates when a node which is attached to a start point is encountered; start points therefore also function as 'stop points'. For example, when a stop point is encountered, the code generator will emit a call to the function shortly to be emitted, corresponding to the start/stop point encountered.

Start point 20 (main) is processed first. Code is generated from the corresponding parse tree node to start a top-level program; for example, a C 'main( )' function. Code generation stops at node 2, with a call to the function corresponding to start point 21.

Start point 21 (iterator) is processed next. The code generated here depends on whether the next start point 22 is an 'ordinary' or cursored access. In this case, start point 22 represents a cursored access, so, for example, C and SQL code is emitted to open, process and close the cursor previously generated for start point 22. This will include a function call to the (for example) C function represented by start point 23. Start point 22 (cursored access) is not subsequently processed separately.

Start point 23 (cursored qualifier) is processed next. This represents a definition for a function which must have a boolean-valued result, but is otherwise treated as an ordinary function call. In this case, code is generated to call the function represented by the stop point 24.

Start point 24 (function) is now processed. In this example, code corresponding to parse tree nodes 8, 9 and 10 is emitted, as well as any further arguments to these functions (not shown).

Start point 25 (function) is processed next. In this example, code corresponding to nodes 11 and 12 will be emitted, as well as a call to the function represented by stop point 26.

Start point 26 (count) is processed next. Again, the code generated here will depend on whether the next start point 27 is an 'ordinary' or cursored access; in this case, it is an 'ordinary' access. Therefore, in this example, inline SQL (using the SQL 'COUNT' function) will be generated for start points 26 and 27, and parse tree nodes 13, 14, 15 and 16. Note that start points 27 and 28 are not further processed subsequently, since it is known that the qualifier and its functions can be generated inline, without further function calls.

The final result for this example is a main program in C, preceded by the definition of one cursor, and a few host variables, and consisting of five function definitions, one of which will include inline embedded SQL code.

In summary then, what has been hereinbefore described, by way of example of the present invention, is a method and an apparatus which, as part of a compiler, supports the generation of code in two (or more) target languages. The selection of the target language, and the program structure in that target language, is made depending on the capabilities of each target language, in a separate processing pass. Runtime efficiency is also improved by allowing selection of the most appropriate target language and program structure for a particular source code function.

What is claimed is:

1. A method for compiling a source program written in a source language into a compiled program comprising a plurality of different target languages, the method comprising:

generating a parse tree from a source program, the parse tree comprising a plurality of nodes each representative of an operation in the source program;

determining, for each successive node of the parse tree, a target language selected from a plurality of different target languages into which the node can be compiled based on the operation represented by the node;

generating, based on the target language determination, a list of start points each corresponding to a different node of the parse tree and each indicating the target language into which the node is to be compiled; and generating successive sections of the compiled program each based on each node of the parse tree between successive start points in the list and each being generated in the target language specified by the first of the successive start points.

2. An apparatus for compiling a source program written in a source language into a compiled program comprising a plurality of different target languages, the apparatus comprising:

means for generating a parse tree from a source program, the parse tree comprising a plurality of nodes each representative of an operation in the source program;

means for determining, for each successive node of the parse tree, a target language selected from a plurality of different target languages into which the node can be compiled based on the operation represented by the node;

means for generating, based on the target language determination, a list of start points each corresponding to a different node of the parse tree and each indicating the target language into which the node is to be compiled; and means for generating successive sections of the compiled program each based on each node of the parse tree between successive start points in the list and each being generated in the target language specified by the first of the successive start points.

3. A computer program device readable by a machine, tangibly embodying a program of instructions executable by a machine to perform method steps for compiling a source program written in a source language into a compiled program comprising a plurality of different languages, the method comprising steps of:

generating a parse tree from a source program, the parse tree comprising a plurality of nodes each representative of an operation in the source program;

determining, for each successive node of the parse tree, a target language selected from a plurality of different target languages into which the node can be compiled based on the operation represented by the node;

generating, based on the target language determination, a list of start points each corresponding to a different node of the parse tree and each indicating the target language into which the node is to be compiled; and generating successive sections of the compiled program each based on each node of the parse tree between successive start points in the list and each being generated in the target language specified by the first of the successive start points.

* * * * *